United States Patent
Graham et al.

(10) Patent No.: US 6,802,889 B2
(45) Date of Patent: Oct. 12, 2004

(54) PRESSURE SWING ADSORPTION SYSTEM FOR GAS SEPARATION

(75) Inventors: David Ross Graham, Harleysville, PA (US); James Michael Occhialini, New Tripoli, PA (US); Pushpinder Singh Puri, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/310,556

(22) Filed: Dec. 5, 2002

(65) Prior Publication Data

US 2004/0107831 A1 Jun. 10, 2004

(51) Int. Cl.[7] .............................................. B01D 53/047
(52) U.S. Cl. ................................ 95/96; 95/98; 95/105; 95/130; 96/130; 96/143; 55/356
(58) Field of Search ............................ 95/96–106, 130, 95/138; 96/130, 143, 144; 55/356

(56) References Cited

U.S. PATENT DOCUMENTS

| | | | | |
|---|---|---|---|---|
| 3,430,418 A | | 3/1969 | Wagner ............................ 55/25 |
| 4,194,891 A | * | 3/1980 | Earls et al. ...................... 95/98 |
| 4,440,548 A | * | 4/1984 | Hill .............................. 95/100 |
| 4,543,109 A | * | 9/1985 | Hamlin et al. .................. 95/98 |
| 5,002,591 A | * | 3/1991 | Stanford ........................ 95/98 |
| 5,656,067 A | * | 8/1997 | Watson et al. ................. 95/101 |
| 5,827,358 A | * | 10/1998 | Kulish et al. .................. 96/115 |
| 5,961,694 A | * | 10/1999 | Monereau et al. .............. 95/98 |
| 5,968,233 A | * | 10/1999 | Rouge et al. ................... 95/96 |
| 6,156,101 A | | 12/2000 | Naheiri ........................ 95/101 |
| 6,268,077 B1 | * | 7/2001 | Kelley et al. .................. 429/33 |
| 6,461,410 B1 | * | 10/2002 | Abe et al. ....................... 95/97 |

* cited by examiner

*Primary Examiner*—Robert H. Spitzer
(74) *Attorney, Agent, or Firm*—Keith D. Gourley; Anne B. Kiernan (57) ABSTRACT

Rapid cycle pressure swing adsorption processes, systems and apparatus for the separation of a multi-component feed gas mixture by selectively adsorbing at least one more readily adsorbable component in a bed of adsorbent material are provided.

37 Claims, 5 Drawing Sheets

PRESSURE SWING ADSORPTION SYSTEM FOR GAS SEPARATION

BACKGROUND OF THE INVENTION

The present invention relates to pressure swing adsorption processes, systems and apparatus for the separation of a multi-component teed gas mixture by selectively adsorbing at least one more readily adsorbable component in a bed of adsorbent material.

Gas separations by pressure swing adsorption (PSA) are achieved by coordinated pressure cycling of a bed of adsorbent material which preferentially adsorbs at least one more readily adsorbable component present in a feed gas mixture relative to at least one less readily adsorbable component present in the feed gas mixture. That is, the bed of adsorbent material is contacted with a ready supply of a feed gas mixture. During intervals while the bed of adsorbent material is subjected to the ready supply of feed gas mixture and the bed is at or above a given feed pressure, a supply of gas depleted in the at least one more readily adsorbable component may be withdrawn from the bed. Eventually, the adsorbent material in the bed becomes saturated with the at least one more readily adsorbable component and must be regenerated. At which point, the bed is isolated from the ready supply of feed gas mixture and a gas enriched in the at least one more readily adsorbable component is withdrawn from the bed, regenerating the adsorbent material. In some instances, the bed may be subjected to a feed of depleted gas to facilitate the regeneration process. Once the adsorbent material is sufficiently regenerated, the bed is again subjected to the ready supply of feed gas mixture and depleted gas can once again be withdrawn from the bed once the pressure on the bed is at or above the given feed pressure. This cycle may be performed repeatedly as required. The period of time required to complete one such cycle is referred to as the "cycle time".

The cyclic nature of the basic pressure swing adsorption process has resulted in the development of multibed systems which can provide a continuous stream of depleted gas. By way of example, one widely used system described in Wagner U.S. Pat. No. 3,430,418, herein incorporated by references as if set forth herein in its entirety, employs four adsorbent beds arranged in a parallel flow relationship. Each bed in the four bed system proceeds sequentially through a multistep cycle. Because a depleted gas stream cannot be withdrawn from a given bed continuously, the four beds are arranged so that a depleted gas stream may be withdrawn from at least one of the four beds at all times.

The efficiency of the separation of a gaseous mixture achieved using a given pressure swing adsorption system depends on various parameters, including the feed pressure, the regeneration pressure, the cycle time, the pressure gradient established across the bed, the type of adsorbent material as well as its size and shape, the dimensions of the adsorption beds, the amount of dead volume in the system, the composition of the gaseous mixture to be separated, the uniformity of flow distribution, the system temperature and the temperature gradient established within said bed. Variations in these parameters can influence the cost and productivity of a given system.

Figure 1:
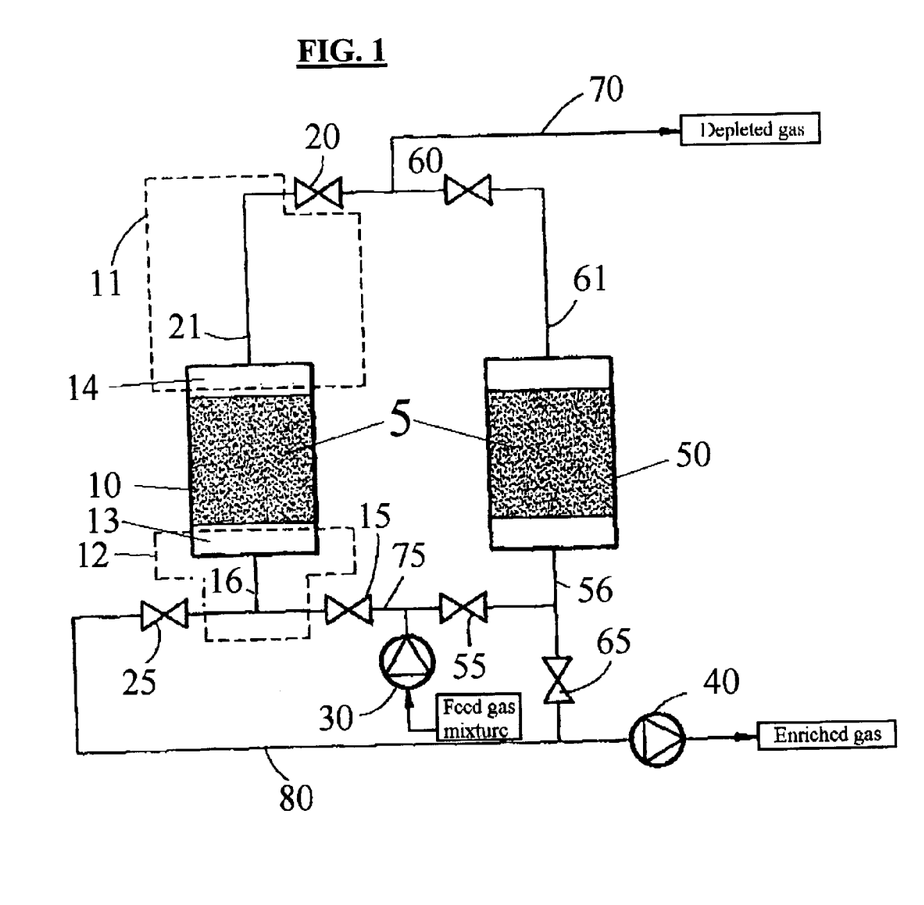
FIG. 1 is a schematic diagram of a conventional pressure swing adsorption system illustrating the meaning of "inlet void volume" and "outlet void volume"

Every pressure swing adsorption system contains dead volume. For purposes of explanation of this dead volume, a conventional two bed pressure swing adsorption system is depicted in FIG. 1. The conventional system comprises two identical beds 10 and 50 of adsorbent material 5. Each of the identical beds 10 and 60 have: a feed gas inlet valve 15 and 55, respectively; a depleted gas outlet valve 20 and 60, respectively; and an enriched gas outlet valve 25 and 65, respectively. The depleted gas outlet valves 20 and 60 are in fluid communication with bed outlet conduits 21 and 61, respectively, and depleted gas conduit 70. The conventional system further comprises a feed prime mover 30 and an exhaust prime mover 40. The feed prime mover 30 intakes a feed gas mixture from the atmosphere or a storage container (not shown) and exhausts the feed gas mixture through feed gas inlet conduit 75 which is in fluid communication with the feed gas inlet valves 15 and 55. The feed gas inlet valves 15 and 55 are also in fluid communication with bed inlet/outlet conduits 16 and 56, respectively. The enriched gas outlet valves 25 and 65 are in fluid communication with the bed inlet/outlet conduits 16 and 56, respectively; and an enriched gas conduit 80. The enriched gas conduit 80 is also in fluid communication with the exhaust prime mover 40.

It should be recognized that the dead volume of a pressure swing adsorption system includes (a) an "inlet void volume" which is the volume that is in fluid communication with the inlet end of the bed of adsorbent material and (b) an "outlet void volume" which is the volume that is in fluid communication with the outlet end of the bed of adsorbent material. It should be understood that, for the purposes of this disclosure, the sum of the "inlet void volume" and the "outlet void volume" for a given pressure swing adsorption system is the "total dead volume" for the given pressure swing adsorption system. It should also be recognized that the bed of adsorbent material will itself contain a "bed void volume" which includes the void spaces between and around the individual particles of adsorbent material or, in the case of structured adsorbents, the spaces not occupied by particles of adsorbent material. It should be understood that for the purposes of this disclosure, the "total dead volume" does not include the "bed void volume".

For example, in FIG. 1, the "inlet void volume" 12 for the bed of adsorbent material 10 is indicated using a dashed line. Likewise, the "outlet void volume" 11 for the bed of adsorbent material 10 is indicated using a dashed line. That is, the "inlet void volume" 12 is the volume which is in communication with the inlet end of the bed of adsorbent material 10. In the pressure swing adsorption system depicted in FIG. 1, it is therefore the sum of the volume of (a) the inlet/outlet conduit 16 between the bed 10 and the bed side of the feed gas inlet valve 15 and the enriched gas outlet valve 25 and (b) the free inlet space 13, the free inlet space may contain a flow distribution system and/or confinement means for supporting the adsorbent material within the bed. Similarly, the "outlet void volume" 11 is the volume which is in communication with the outlet end of the bed of adsorbent material 10. In the pressure swing adsorption system depicted in FIG. 1, it is therefore the sum of the volume of (a) the outlet conduit 21 between the bed 10 and the bed side of the depleted gas outlet valve 20 and (b) the free outlet space 14, for example space required by a confinement means for retaining the adsorbent material within the bed and reducing the potential for fluidizing the adsorbent material.

Every pressure swing adsorption system contains some dead volume. Notwithstanding, the benefits of reducing the size of the dead volume are readily understood by those skilled in the art. Such benefits include improved recovery and productivity. Recognizing the benefits of reducing the total dead volume of a pressure swing adsorption system, however, is quite distinct from recognizing how to effect a reduction in the total dead volume.

To avoid an early breakthrough of an impurity through the bed, conventional adsorption systems incorporate a flow distributor in fluid communication with the inlet of the bed. The purpose of the flow distributor is to distribute the flow of feed gas uniformly across the entire bed cross-section to avoid inefficiencies caused by such early breakthroughs of impurities. Conventional flow distributors, however, introduce dead volume into the system. As noted above, such dead volume tends to negatively influence the efficiency of the gas separation.

Many conventional adsorption systems use a single pump or other type of conventional prime mover to transfer a feed gas mixture into the bed during one part of the adsorption cycle and withdraw an enriched gas from the bed during another part of the cycle. Because the direction of flow through conventional prime movers cannot be quickly reversed, a complex valving system is employed to change the direction of flow of gas relative to the bed. Such a system is described in, for example, U.S. Pat. No. 6,156,101. The increase in complexity associated with the use of such valving systems provides additional opportunity for system failures.

It is well known that, at least in theory, a decrease in the cycle time for a given adsorption system should decrease the adsorbent requirement and facilitate a reduction in the overall size and weight of the system apparatus. In practice, however, decreases in cycle time introduce a plethora of operational challenges. For example, decreases in cycle times invariably necessitate an increased frequency of valve switching, which may reduce system reliability. Valves require a certain amount of time to transition from one position to another. Hence, as the cycle time becomes increasingly short (i.e., approaches the transition time for the valves), the system efficiency will actually be seen to decrease with further decreases in the cycle time. The pressure difference between the bed inlet and the bed outlet is another operational challenge to the implementation of decreased cycle times. That is, this pressure difference increases as the cycle time decreases. The significance of this increased pressure difference can be alleviated to a degree by employing a bed having a relatively short bed depth. For systems which exhibit a relatively short bed depth, the pressure gradient (pressure difference divided by bed depth) will be relatively large, but the pressure difference will be relatively small. In theory, operation in this high pressure gradient regime is beneficial; however, in conventional systems, the total dead volume tends to be large relative to the bed volume (i.e., the volume physically occupied by adsorbent material) and the shortness of the bed depth presents a significant flow distribution challenge. As a result of the challenges associated with flow distribution and void volume, discussed above, the potential benefits of operating in this high-pressure gradient regime have not been fully realized.

While pressure swing adsorption processes typically operate at pressures above atmospheric pressure, some may operate at pressures below atmospheric pressure during all or part of the adsorption cycle and may be described as vacuum swing adsorption (VSA) or vacuum-pressure swing adsorption (VPSA) processes. For the purposes of the instant specification, the term "pressure swing adsorption" (PSA) is used generically to describe all types of cyclic adsorption processes including vacuum swing adsorption and vacuum-pressure swing adsorption processes.

The "volume of the bed", "bed volume" or Vbed, as these terms are used herein and in the appended claims, is the volume physically occupied by the adsorbent material. For adsorbent beds comprised of individual porous particles, the volume of the bed includes the interstitial void space between adjacent particles, the volume of void space within the individual particles, and the volume occupied by the solid portion of the adsorbent particles.

The "bed depth", L, as that term is used herein and in the appended claims, is the shortest distance through the bed from the surface where feed gas enters the bed—the "inlet surface"—to the surface where the depleted gas exits the bed—the "outlet surface".

The "equivalent diameter", as that term is used herein and in the appended claims, is the diameter of a sphere having a volume equivalent to the volume of a given particle.

The "average equivalent diameter", $\overline{dp}$, as that term is used herein and in the appended claims, is according to the following equation, $$\overline{dp} = \sum_{\text{all } i} x_i dp_i$$

where $x_i$ is the weight fraction of particles with equivalent diameter $dp_i$.

"Standard liters per minute", as that term is used herein and in the appended claims, is the volume of gas at a temperature of 25° C. and a pressure of 1 atmosphere.

"Prime mover", as that term is used herein and in the appended claims, means any pump, compressor, blower or similar device suitable for facilitating the transfer of a fluid, particularly a vapor or gas, from one place to another.

SUMMARY OF THE INVENTION

In an embodiment of the present invention, a pressure swing adsorption process for the separation of a multi-component feed gas mixture is provided which involves selectively adsorbing at least one more readily adsorbable component of the multi-component feed gas mixture in a bed of adsorbent material by a process including (a) pressurizing the bed; (b) passing the feed gas mixture through the bed from an inlet surface of the bed to an outlet surface of the bed, wherein the at least one more readily adsorbable component is preferentially adsorbed by the adsorbent material, and withdrawing a depleted gas depleted in the at least one more readily adsorbable component exiting from the outlet surface of the bed; (c) depressurizing the bed by withdrawing an enriched gas enriched in the at least one more readily adsorbable component from the bed; (d) repeating (a)–(c) in a cyclic manner.

In one aspect of this embodiment of the present invention, the bed has a bed depth, L, and a bed volume, Vbed; wherein the bed has an aspect ratio according to equation (1)

$$\text{Aspect ratio} = L^3/Vbed \tag{1}$$

wherein the aspect ratio for the bed is less than 10, less than 5, less than 0.25, or less than 0.125; and, wherein the mean pressure gradient in the bed in (b) exceeds 0.035 psi/inch, exceeds 0.05 psi/inch, exceeds 0.5 psi/inch, or exceeds 1 psi/inch.

In another aspect of this embodiment of the present invention, the feed gas mixture is air and the depleted gas contains oxygen at a concentration of at least 70 mol %, at least 80 mol %, or at least 90 mol %.

In another aspect of this embodiment of the present invention, the depleted gas contains hydrogen at a concentration of at least 80 mol %, at least 95 mol %, or at least 99 mol %.

In another aspect of this embodiment of the present invention, the production rate for the depleted gas is between 0.5 and 10 standard liters per minute, between 0.5 and 5 standard liters per minute, or between 1 and 3 standard liters per minute.

In another aspect of this embodiment of the present invention, each repeat of (a) through (c) defines a cycle with a cycle time of 30 seconds or less, less than 15 seconds, less than 6 seconds, or less than 1 second.

In another aspect of this embodiment of the present invention, the bed contains adsorbent particles with an average equivalent diameter of less than 1.0 mm, less than 0.5 mm, or less than 0.1 mm.

In another aspect of this embodiment of the present invention, the bed may contain structured adsorbent. For example, the bed may contain structured adsorbents selected from the group of monoliths, laminates, gauzes, and other adsorbent supports.

In another aspect of this embodiment of the present invention, the bed exhibits a Void factor according to equation (2) of less than 0.2, less than 0.1, or less than 0.05, $$\text{Void factor} = \frac{Vvoid}{Vvoid + Vbed} \quad (2)$$

wherein Vvoid is the total dead volume in the pressure swing adsorption system and Vbed is the bed volume.

In another embodiment of the present invention, a pressure swing adsorption process for the separation of a multi-component feed gas mixture is provided which involves selectively adsorbing at least one more readily adsorbable component of the multi-component feed gas mixture in a bed of adsorbent material having an inlet surface and an outlet surface by a process including (a) pressurizing the bed; (b) passing the feed gas mixture through the bed, wherein the at least one more readily adsorbable component is preferentially adsorbed by the adsorbent material, and withdrawing a depleted gas depleted in the at least one more readily adsorbed component exiting from the bed; (c) halting the withdrawal of the depleted gas from the bed and halting the feed of the feed gas mixture to the bed; (d) depressurizing the bed by withdrawing an enriched gas enriched in the at least one more readily adsorbable component from the bed; (e) feeding a portion of the depleted gas into the bed to facilitate the extraction of the at least one more readily adsorbable component from the adsorbent material, (f) repeating operations (a)–(e) in a cyclic manner; wherein the at least one more readily adsorbable component is preferentially adsorbed by the adsorbent material at the feed pressure, wherein the bed has a bed depth, L, and a bed volume, Vbed; wherein the bed has an aspect ratio according to equation (1)

$$\text{Aspect ratio} = L^3/Vbed \quad (1)$$

wherein the aspect ratio for the bed is less than 10, less than 5, less than 0.25, or less than 0.125; and, wherein the mean pressure gradient in the bed in (b) exceeds 0.035 psi/inch, exceeds 0.05 psi/inch, exceeds 0.5 psi/inch, or exceeds 1 psi/inch.

In an aspect of this embodiment of the present invention, each repeat of (a) through (e) defines a cycle with a cycle time of 30 seconds or less, less than 15 seconds, less than 6 seconds, or less than 1 second.

In another embodiment of the present invention, a pressure swing adsorption system for the separation of a multi-component feed gas mixture is provided which involves selectively adsorbing at least one more readily adsorbable component of the multi-component feed gas mixture in a bed of adsorbent material including: (a) at least one bed of the adsorbent material, wherein the adsorbent material more strongly adsorbs the at least one more readily adsorbable component and wherein the at least one bed has at least one inlet surface and at least one outlet surface: (b) at least one prime mover supplying the multi-component feed gas mixture to the pressure swing adsorption system; and (c) an array of valves in fluid communication with the at least one inlet; wherein the valves cycle from an open to a closed position in 1 second or less, less than 0.1 second, or less than 0.01 second.

In an aspect of this embodiment of the present invention, the at least one bed exhibits a bed depth, L, and a bed volume, Vbed; wherein the at least one bed has an aspect ratio according to equation (1)

$$\text{Aspect ratio} = L^3/Vbed \quad (1)$$

wherein the aspect ratio for the at least one bed is less than 10, less than 5, less than 0.25, or less than 0.125.

In another aspect of this embodiment of the present invention, the at least one bed exhibits a Void factor according to equation (2) of less than 0.2, less than 0.1, or less than 0.05, $$\text{Void factor} = \frac{Vvoid}{Vvoid + Vbed} \quad (2)$$

wherein Vvoid is the total dead volume in the pressure swing adsorption system and Vbed is the bed volume.

In another aspect of this embodiment of the present invention, the array of valves contains at least 4 individual valves, at least 20 valves, or at least 100 valves.

In another aspect of this embodiment of the present invention, the valves in the array of valves are selected from piezoelectric valves, shape memory alloy valves, electrostatic valves, bimetallic valves, thermopneumatic valves and electromagnetic valves.

In another embodiment of the present invention, a pressure swing adsorption system for the separation of a multi-component feed gas mixture is provided which involves selectively adsorbing at least one more readily adsorbable component of the multi-component feed gas mixture in a bed of adsorbent material including: (a) at least one bed of the adsorbent material, wherein the adsorbent material more strongly adsorbs the at least one more readily adsorbable component and wherein the at least one bed has at least one inlet surface and at least one outlet surface; and (b) at least one array of prime movers in fluid communication with the at least one inlet surface; wherein flow through the at least one array of prime movers can be started or stopped in less than 2 seconds, less than 0.5 seconds, or less than 0.1 seconds.

In an aspect of this embodiment of the present invention, the at least one bed has a bed depth, L, and a bed volume, Vbed; wherein the at least one bed has an aspect ratio according to equation (1)

$$\text{Aspect ratio} = L^3/Vbed \quad (1)$$

wherein the aspect ratio for the at least one bed is less than 10, less than 5, less than 0.25, or less than 0.125.

In another aspect of this embodiment of the present invention, the at least one bed has a Void factor according to equation (2) of less than 0.2, less than 0.1, or less than 0.05, $$\text{Void factor} = \frac{Vvoid}{Vvoid + Vbed} \quad (2)$$

wherein Vvoid is the total dead volume in the pressure swing adsorption system and Vbed is the bed volume.

In another aspect of this embodiment of the present invention, the pressure swing adsorption system may further include at least one array of exhaust prime movers in fluid communication with the at least one outlet surface of the bed.

In another aspect of this embodiment of the present invention, the at least one array of prime movers contains: an array of feed prime movers in fluid communication with the at least one inlet surface of the at least one bed, wherein the array of feed prime movers operates to feed the feed gas mixture into the at least one bed; and, an array of exhaust prime movers in fluid communication with the at least one inlet surface of the at least one bed, wherein the array of exhaust prime movers operates to withdraw an enriched gas from the at least one bed.

In another aspect of this embodiment of the present invention, the at least one array of prime movers operates to transfer the feed gas mixture into the at least one bed during a feed gas feeding step and operates to withdraw an enriched gas from the bed during a regeneration step.

In another aspect of this embodiment of the present invention, each array of prime movers contains at least 4 individual prime movers, at least 20 individual prime movers, or at least 100 individual prime movers.

In another aspect of this embodiment of the present invention, the individual prime movers in the at least one array of prime movers should be capable of initiating or stopping the flow of gas therethrough in 2 seconds or less, less than 0.5 seconds, or less than 0.1 seconds and include, but are by no means limited to, piezoelectric pumps, thermopneumatic pumps, electrostatic pumps, ultrasonic pumps, electro-osmosis pumps, electrohydrodynamic pumps, electromagnetic pumps, rotary pumps, shape memory alloy pumps, bimetallic pumps, diaphragm pumps, rotary vane pumps, scroll pumps, solenoid pumps, stepper-motor actuated pumps, piston pumps, linear pumps. In a particular aspect of this embodiment, the individual prime movers in the at least one array of prime movers include microelectromechanical (MEM) pumps selected from MEM piezoelectric pumps, MEM thermopneumatic pumps, MEM electrostatic pumps, MEM electromagnetic pumps, MEM ultrasonic pumps, MEM electro-osmosis pumps, MEM diaphragm pumps and MEM electrohydrodynamic pumps.

In another embodiment of the present invention, an apparatus for the pressure swing adsorption of a multi-component feed gas mixture by selectively adsorbing at least one more readily adsorbable component on an adsorbent material, is provided including: (a) a bed of adsorbent material with at least one inlet surface and at least one outlet surface; wherein the adsorbent material more strongly adsorbs the at least one more readily adsorbable component; and (b) an array of valves in fluid communication with the at least one inlet surface; wherein the valves cycle from an open to a closed position in 1 second or less, less than 0.1 seconds, or less than 0.01 seconds.

In an aspect of this embodiment of the present invention, the at least one bed exhibits a bed depth, L, and a bed volume, Vbed; wherein the at least one bed has an aspect ratio according to equation (1)

$$\text{Aspect ratio} = L^3/Vbed \quad (1)$$

wherein the aspect ratio for the at least one bed is less than 10, less than 5, less than 0.25, or less than 0.125.

In another aspect of this embodiment of the present invention, the at least one bed exhibits a Void factor according to equation (2) of less than 0.2, less than 0.1, or less than 0.05, $$\text{Void factor} = \frac{Vvoid}{Vvoid + Vbed} \quad (2)$$

wherein Vvoid is the total dead volume in the pressure swing adsorption system and Vbed is the bed volume.

In another aspect of this embodiment of the present invention, the at least one bed exhibits a geometry selected from the group consisting of a cylinder with a circular cross section, a cylinder with a non-circular cross section, a rectangular parallelepiped, or the annular region between two coaxial cylinders.

In another aspect of this embodiment of the present invention, the apparatus is designed and sized to be carried by an individual.

In another aspect of this embodiment of the present invention, the apparatus is designed to provide oxygen for medical purposes.

In another aspect of this embodiment of the present invention, the apparatus is designed to provide hydrogen for use in a fuel cell.

In another embodiment of the present invention, an apparatus for the pressure swing adsorption of a multi-component feed gas mixture by selectively adsorbing at least one more readily adsorbable component on an adsorbent material, is provided including: (a) a bed of adsorbent material with at least one inlet surface and at least one outlet surface; wherein the adsorbent material more strongly adsorbs the at least one more readily adsorbable component; and (b) at least one array of prime movers in fluid communication with the at least one inlet surface; wherein flow through the at least one array of prime movers can be started or stopped in 2 seconds or less, less than 0.5 seconds, or less than 0.1 seconds.

In an aspect of this embodiment of the present invention, the at least one bed exhibits a bed depth, L, and a bed volume, Vbed; wherein the at least one bed has an aspect ratio according to equation (1)

$$\text{Aspect ratio} = L^3/Vbed \quad (1)$$

wherein the aspect ratio for the at least one bed is less than 10, less than 5, less than 0.25, or less than 0.125.

In another aspect of this embodiment of the present invention, the at least one bed exhibits a Void factor according to equation (2) of less than 0.2, less than 0.1, or less than 0.05, $$\text{Void factor} = \frac{Vvoid}{Vvoid + Vbed} \quad (2)$$

wherein Vvoid is the total dead volume in the pressure swing adsorption system and Vbed is the bed volume.

In another aspect of this embodiment of the present invention, the apparatus is designed and sized to be carried by an individual.

In another aspect of this embodiment of the present invention, the apparatus is designed to provide oxygen for medical purposes.

In another aspect of this embodiment of the present invention, the apparatus is designed to provide hydrogen for use in a fuel cell.

BRIEF DESCRIPTION OF THE DRAWINGS

There are shown in the drawings certain exemplary embodiments of the present invention as presently preferred. It should be understood that the present invention is not limited to the embodiments disclosed as examples, and is capable of variation within the spirit and scope of the appended claims.

In the drawings.

DETAILED DESCRIPTION

Embodiments of the present invention will now be described with reference to the drawings. This detailed description is of a presently contemplated mode of carrying out the present invention and is not intended in a limiting sense. Rather, it is made solely for the purpose of illustrating the general principles of the present invention.

The pressure swing adsorption processes of the present invention provide a ready means for the separation of a multi-component feed gas mixture by selectively adsorbing at least one more readily adsorbable component in a bed of adsorbent material. The pressure swing adsorption processes of the present invention include the following process operations, namely: (a) bed pressurization; (b) gas separation; (c) bed regeneration. These process operations are repeated cyclically with a total cycle time (i.e., the time required to perform a complete cycle of (a) through (c)) of 30 seconds or less, less than 15 seconds, less than 6 seconds, or less than 1 second.

The bed pressurization step involves the pressurization of the bed. That is, during this step of the process, material is introduced into the bed to raise the pressure in the bed to a given set feed pressure. The material used to pressurize the bed may, for example, be the feed gas mixture, depleted gas or some other gas. The affinity of the adsorbent material for the at least one more readily adsorbable component of the feed gas mixture is generally pressure dependent. Accordingly, the given set feed pressure is a process variable which may be varied to help optimize the efficiency of the pressure swing adsorption process.

The gas separation step involves the simultaneous introduction of feed gas mixture into the bed and the withdrawal of a depleted gas from the bed. The depleted gas can be simultaneously used for some other process or operation upon production. Alternatively, the depleted gas can be collected and stored for later use or further processing.

At some point, the adsorbent material in the bed will start to become saturated with the at least one more readily adsorbable component. In most cases, it is preferable to halt the gas separation step before the adsorbent material in the bed becomes saturated with the at least one more readily adsorbable component. As the adsorbent material approaches saturation, the likelihood of breakthrough increases. Breakthrough is a term used to describe the situation wherein the amount of the at least one more readily adsorbable component passing through the bed of adsorbent material increases sharply. Breakthrough is generally to be avoided because it can lead to a significant contamination of the depleted gas. Accordingly, the length of the separation step is another design parameter which may affect both the purity and yield of the depleted gas obtained as well as the overall efficiency of the process.

The bed regeneration step involves the desorption of the at least one more readily adsorbable component from the adsorbent material in the bed. This desorption is effected through the reduction of the pressure in the bed below the given set feed pressure. This reduction in pressure can be effected by simply withdrawing an enriched gas from the bed by releasing the pressure. Alternatively, a prime mover is used to pull gas from the bed. Also, optionally, a stream of depleted gas or some other material may be passed through the bed to help facilitate the desorption of the at least one more readily adsorbable component from the adsorbent material in the bed.

One skilled in the art will recognize that dimensionally shorter beds, that is, beds having a short bed depth relative to the overall volume of the bed help to facilitate rapid cycle times by helping to keep the pressure difference across the bed low. The pressure swing adsorption processes of the present invention may be characterized by the use of a bed having an Aspect ratio of less than 10, less than 5, less than 0.25, or less than 0.125; and an associated mean pressure gradient that exceeds 0.035 psi/inch, exceeds 0.05 psi/inch, exceeds 0.5 psi/inch, or exceeds 1 psi/in during the separation step. The aspect ratio may be determined using equation (1)

$$\text{Aspect ratio} = L^3/V_{bed} \tag{1}$$

wherein L is the depth of the bed and $V_{bed}$ is the bed volume.

In addition, one skilled in the art will recognize the benefits associated with the minimization of the total dead volume for a given adsorption system. The pressure swing adsorption processes of the present invention may be characterized by the use of a bed having a Void factor of less than 0.2, less than 0.1 or less than 0.05, wherein the Void factor is according to equation (2)

$$\text{Void factor} = \frac{V_{void}}{V_{void} + V_{bed}} \tag{2}$$

wherein $V_{void}$ is the total dead volume for the pressure swing adsorption system and $V_{bed}$ is the bed volume.

Adsorbent materials suitable for use with the present invention are many and varied. Examples of adsorbent material suitable for use with the present invention include activated carbon; carbon molecular sieve adsorbents; activated alumina; silica gel; and zeolites including those with type A, type X, mordenite and chabazite structure. Examples of suitable zeolites include CaA, NaX, CaX, NaA, BaX, LiX, NaLSX, CaLSX, BaLSX, AgLSX and LiLSX. One skilled in the art would know how to select an adsorbent material for use with a given feed gas mixture and desired product materials.

The adsorbent material contained in the adsorbent beds used in the present invention may be present in the bed in the form of individual particles dispersed in the bed. When the adsorbent material is present in the bed in the form of dispersed individual particles, various containment structures may optionally be included in the bed to reduce the potential for fluidization of the individual particles. Many types of these containment structures are well known in the art. For example, a suitable containment structure can be a fine mesh screen placed on top of the adsorbent with springs used to hold the screen and the adsorbent in place. Other suitable containment structures include structures that are suitable for small-scale systems with small adsorbent particles. For example, Losey, et al., *Microfabricated Multiphase Packed-Bed Reactors; Characterization of Mass Transfer and Reactions,* IND. ENG. CHEM. RES. 2001, 40, pp 2555–2562 and Oleschuk, et al., *Trapping of bead-based reagents within micro-fluidic systems: On-chip solid-phase extraction and electrochromatography,* ANAL. CHEM., 200, 72(3), pp 585–590, disclose suitable methods for the isolation of beds of small particles. Both of these references are incorporated herein by reference as if set forth herein in their entireties.

The adsorbent material may be present in the bed in the form of a structured adsorbent support such as monoliths, laminates and gauzes. Wan, et al., *Design and fabrication of zeolite-based microreactors and membrane microseparators,* MICROPOROUS AND MESOPOROUS MATERIALS, 42 (2001) pp. 157–175, disclose examples of methods suitable for use in the production of structured adsorbent materials. This reference is incorporated herein by reference as if set forth herein in its entirety.

In some embodiments of the present invention, the adsorbent materials used may have an average equivalent diameter of less than 1.0 mm, less than 0.5 mm, or less than 0.1 mm.

Some embodiments of the present invention provide pressure swing adsorption processes capable of providing a depleted gas production rate of between 0.5 and 10 standard liters per minute, between 0.5 and 5 standard liters per minute, or between 1 and 3 standard liters per minute.

The pressure swing adsorption processes of the present invention are suitable for use with a wide variety of feed gas mixtures to provide a variety of product gases. For example, the pressure swing adsorption processes of the present invention are suitable for use with the following:

(a) feed gas mixture may be atmospheric air with a product depleted gas containing oxygen at a concentration of at least 70 mol %, at least 88 to 93 mol %, or at least 93 mol % using an adsorbent material selected from carbon molecular sieve adsorbents, and zeolites including zeolites with type A, type X, mordenite, and chabazite structure (examples of specific zeolites include CaA, NaX, CaX, NaA, BaX, LiX, NaLSX, CaLSX, BaLSX, AgLSX and LiLSX);

(b) feed gas mixture may be a mixture of hydrogen, carbon monoxide, carbon dioxide, methane and nitrogen with a product depleted gas containing hydrogen at a concentration of at least 80 mol %, at least 95 mol %, or at least 99 mol % using an adsorbent material selected from activated carbon and zeolites;

(c) feed gas mixture may be atmospheric air and water with a product depleted gas containing dry atmospheric air containing less than 0.5 mol % water, less than 0.1 mol % water or less than 0.01 mol % water, using an adsorbent selected from activated alumina, silica gel, activated carbon and zeolites including zeolites with type A, type X, mordenite, and chabazite structure (examples of specific zeolites include CaA, NaX, CaX, NaA, BaX, LiX, NaLSX, CaLSX, BaLSX, AgLSX and LiLSX); and, (d) feed gas mixture may be a mixture of hydrogen, carbon monoxide and water with a product depleted gas containing a dry hydrogen/carbon monoxide blend containing less than 0.5 mol % water, less than 0.1 mol % water or less than 0.01 mol % water, using an adsorbent material selected from activated alumina silica gel, activated carbon and zeolites including zeolites with type A, type X, mordenite, and chabazite structure (examples of specific zeolites include CaA, NaX. CaX, NaA, BaX, LiX, NaLSX, CaLSX, BaLSX, AgLSX and LiLSX).

In the pressure swing adsorption systems of the present invention, the multi-component feed gas mixture may be fed from a storage container or a pipeline into the system or may be taken from the atmosphere surrounding the system, for example, systems with atmospheric air as the feed gas mixture. In those systems of the present invention wherein the feed gas mixture is fed from a storage container, the storage container may, for example, be a cylinder containing the multi-component feed gas mixture under sufficient pressure to provide a ready supply of the feed gas directly to the system. Alternatively, the system may further include a prime mover or an array of prime movers to transfer the feed gas mixture from a storage container to the system.

Also, in the pressure swing adsorption systems of the present invention, the enriched gas withdrawn from the system may be diverted for simultaneous use in a given application, may be collected in a storage container for subsequent use, or may be vented directly to the atmosphere. Enriched gases produced using the pressure swing adsorption systems of the present invention may be used for various applications including, for example, as fuel or to provide an inert atmosphere.

Further, in the pressure swing adsorption systems of the present invention, the depleted gas withdrawn from the system may be diverted for simultaneous use in another process, may be collected in a storage container for subsequent use, or may be vented directly to the atmosphere. Depleted gases produced using the pressure swing adsorption systems of the present invention may be used for various applications including, for example, as breathable oxygen for medical purposes; to oxygenate water; to provide reactant for chemical reactions; to provide feed to a combustion system; or to provide hydrogen to a proton exchange membrane fuel cell, an alkaline fuel cell, a phosphoric acid fuel cell, a molten carbonate fuel cell, or a solid oxide fuel cell. These fuel cells may be suitable for stationary applications, transportation applications and portable applications. An example of a portable fuel cell is described in U.S. Pat. No. 6,268,077.

Figure 2:
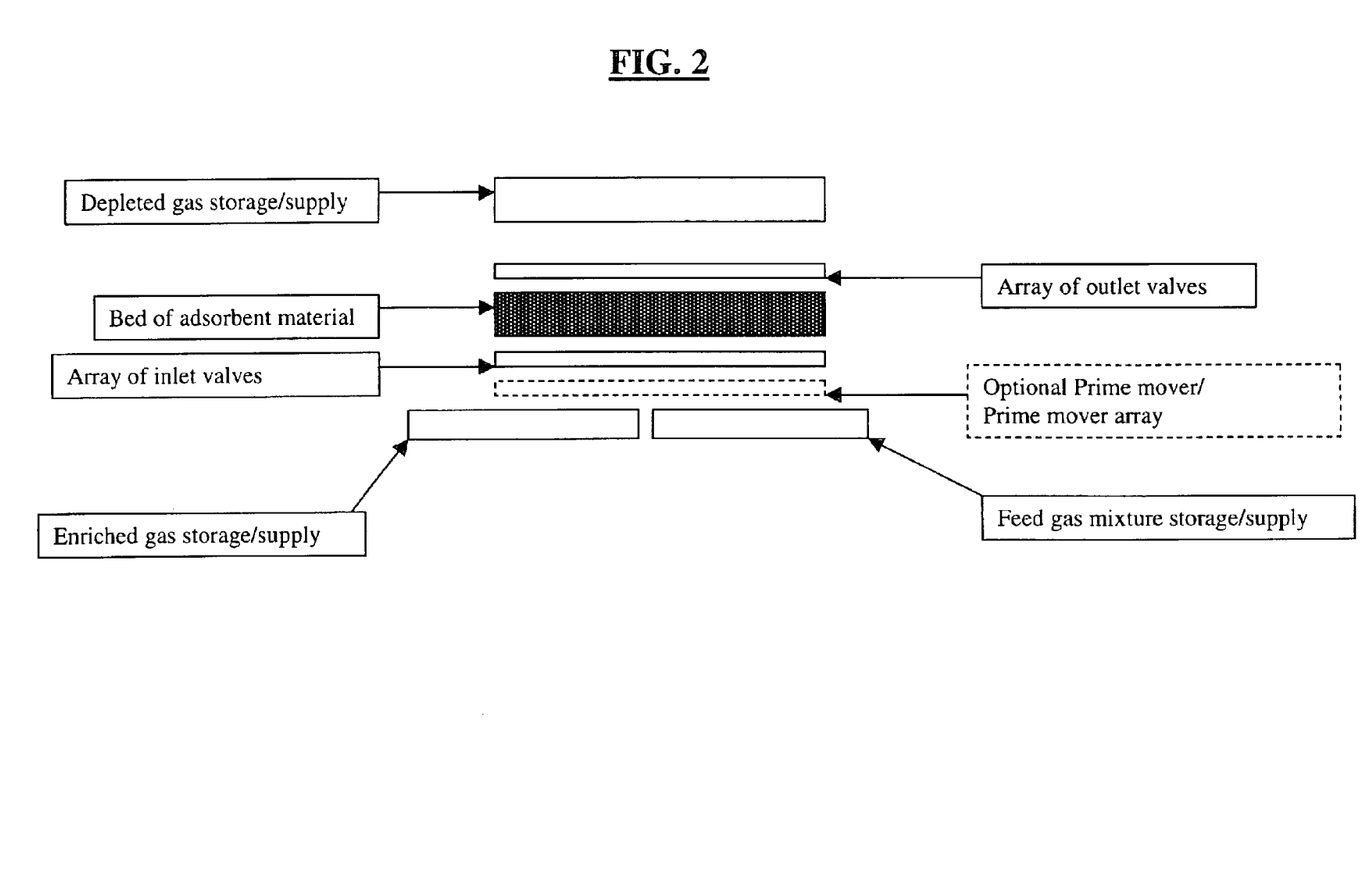
FIG. 2 is a schematic view of the arrangement of the depicted components of a pressure swing adsorption system of the present invention.

FIG. 2 depicts an example of a pressure swing adsorption system of the present invention. The pressure swing adsorption systems in this embodiment of the present invention provide a ready means for separating multi-component feed gas mixtures by selectively adsorbing at least one more readily adsorbable component from a feed gas mixture in a bed of adsorbent material. The pressure swing adsorption systems of the present invention include: (a) a bed of adsorbent material, which adsorbent material more strongly adsorbs the at least one more readily adsorbable component in a multi-component feed gas mixture fed to the pressure swing adsorption system, wherein the bed has at least one inlet surface and at least one outlet surface; (b) an array of valves in fluid communication with the at least one inlet surface, wherein the valves cycle from an open to a closed position in 1 second or less, less than 0.1 seconds, or less than 0.01 seconds; and (c) an optional prime mover or array of prime movers to supply the multi-component feed gas mixture to the bed.

The pressure swing adsorption systems of the present invention may employ one or more beds of adsorbent material having an Aspect ratio of less than 10, less than 5, less than 0.25, or less than 0.125; and an associated mean pressure gradient that exceeds 0.035 psi/inch, exceeds 0.05 psi/inch, exceeds 0.5 psi/inch, or exceeds 1 psi/inch during the separation step. The aspect ratio may be determined using equation (1)

$$\text{Aspect ratio} = L^3/Vbed \qquad (1)$$

wherein L is the bed depth and Vbed is the bed volume.

The pressure swing adsorption systems of the present invention may also employ one or more adsorption beds having a Void factor of less than 0.2, less than 0.1 or less than 0.05, wherein the Void factor is according to equation (2)

$$\text{Void factor} = \frac{Vvoid}{Vvoid + Vbed} \qquad (2)$$

wherein Vvoid is the total dead volume for the pressure swing adsorption system and Vbed is the bed volume.

The pressure swing adsorption systems of the present invention may employ any conventional prime mover suitable for use in supplying the multi-component feed gas mixture to the system. The pressure swing adsorption systems of the present invention may alternatively employ an array of prime movers, which array contains at least 4 individual prime movers, at least 20 individual prime movers, or at least 100 individual prime movers.

Prime movers suitable for use in the arrays of prime movers of the present invention should be capable of initiating or stopping the flow of gas therethrough in 2 seconds or less, less than 0.5 seconds, or less than 0.1 seconds and include, but are by no means limited to, piezoelectric pumps, thermopneumatic pumps, electrostatic pumps, ultrasonic pumps, electro-osmosis pumps, electrohydrodynamic pumps, electromagnetic pumps, rotary pumps, shape memory alloy pumps, bimetallic pumps, diaphragm pumps, rotary vane pumps, scroll pumps, solenoid pumps, stepper-motor actuated pumps, piston pumps, and linear pumps. In some embodiments of the present invention, the individual prime movers in the prime mover arrays include microelectromechanical (MEM) pumps selected from MEM piezoelectric pumps, MEM thermopneumatic pumps, MEM electrostatic pumps, MEM electromagnetic pumps, MEM ultrasonic pumps, MEM electro-osmosis pumps, MEM diaphragm pumps and MEM electrohydrodynamic pumps.

Arrays of valves suitable for use with the pressure swing adsorption systems of the present invention include at least 4 individual valves, at least 20 individual valves or at least 100 individual valves. Individual valves suitable for use in the valve arrays of the present invention should be capable of cycling from an open to a closed position in 1 second or less, less than 1 second, less than 0.1 seconds, or less than 0.01 seconds and include, but are by no means limited to, piezoelectric valves, shape memory alloy valves, electrostatic valves, bimetallic valves, thermopneumatic valves and electromagnetic valves. In some embodiments of the present invention, the individual valves used in the valve arrays include microelectricalmechanical (MEM) valves selected from MEM piezoelectric valves, MEM shape memory alloy valves, MEM electrostatic valves, MEM bimetallic valves, MEM thermopneumatic valves and MEM electromagnetic valves. The valves used in the valve arrays of the present invention may include valves with external actuators or internal actuators. The valves may also include check valves which rely on pressure differences across the valves instead of an independently controllable actuator for their operation. All of the valves in a given valve array may work in unison. Alternatively, the valves in a given valve array may operate individually or in groups. For example, the valves in a given valve array may be tasked to operate in sequence or may be separately tasked to facilitate various aspects of the pressure swing adsorption process. For instance, some of the valves in a given valve array may be tasked to open and close to facilitate the flow of feed gas to the bed of adsorbent material while other valves in the array may be tasked to facilitate the withdrawal of enriched gas from the bed of adsorbent material.

Valve arrays suitable for use with the present invention may provide a multiplicity of valves in a parallel configuration. When so configured, an array of valves of the present invention may be designed to deliver or withdraw a gas to or from a bed of adsorbent material, thus providing a flow distribution function and alleviating the need for a separate flow distributor and the dead volume typically associated therewith. Due to the enhanced flow distribution with minimal dead volume, the valve arrays of the present invention facilitate adsorption processes, such as processes with small aspect ratios, that were heretofore not practical given conventional systems.

Also, valve arrays suitable for use with the present invention provide opportunities for enhanced flow control which may be achieved by opening or closing certain valves in a given array based on the flow requirements at a given stage of the pressure swing adsorption process.

In addition, the valve arrays may provide systems with enhanced reliability in that one or more valves in a given array can fail without causing a significant decrease in the overall system performance.

Figure 3:
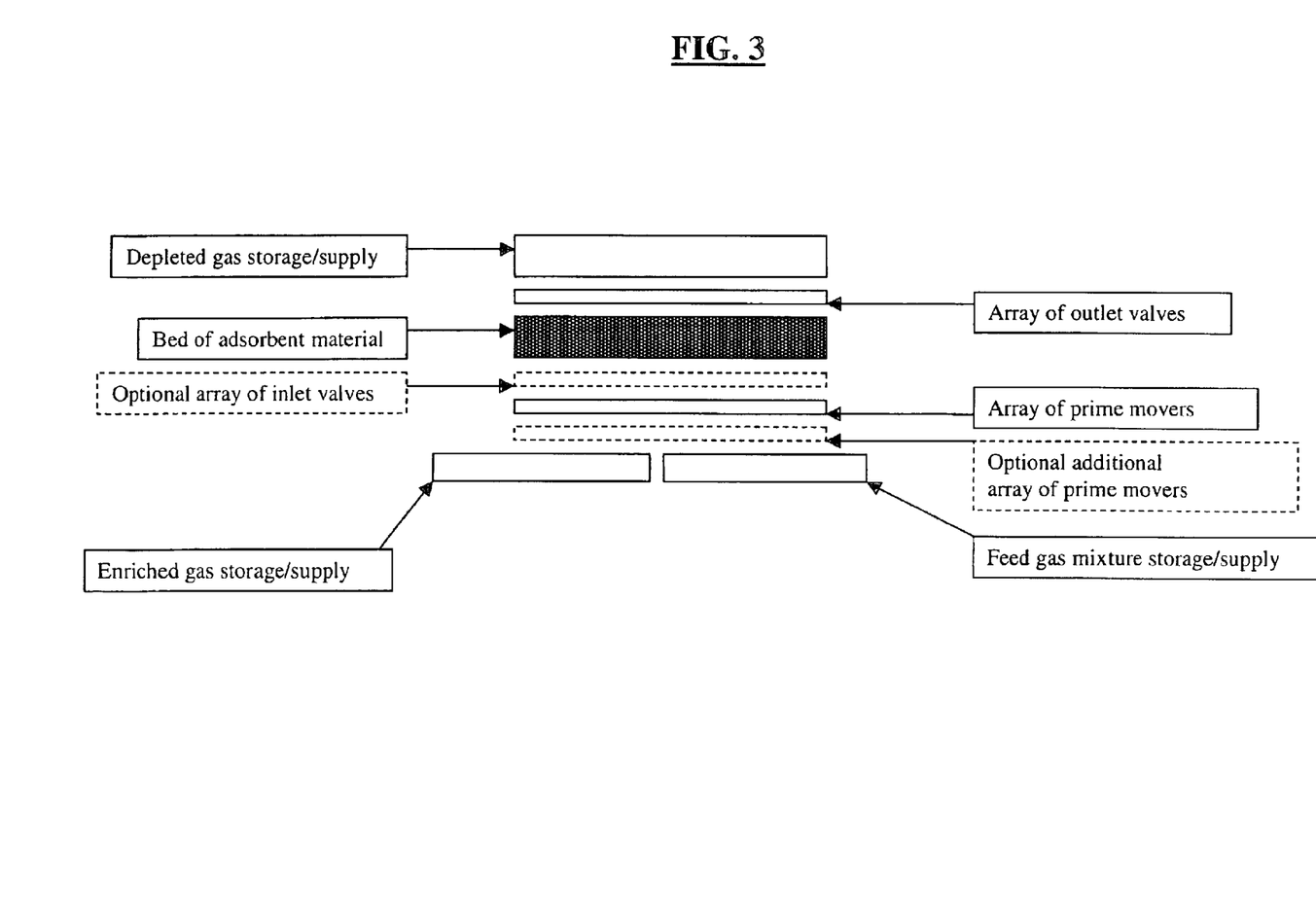
FIG. 3 is a schematic view of the arrangement of the depicted components of a pressure swing adsorption system of the present invention.

FIG. 3 depicts another example of a pressure swing adsorption system of the present invention. The pressure swing adsorption systems of this example of the present invention include: (a) at least one bed of adsorbent material, which adsorbent material more strongly adsorbs the at least one more readily adsorbable component in a multi-component feed gas mixture fed to the pressure swing adsorption system, wherein the at least one bed has at least one inlet surface and at least one outlet surface; (b) at least one array of prime movers in fluid communication with the at least one inlet surface; (c) optionally, an array of valves at the at least one inlet surface in fluid communication with the at least one bed; and (d) optionally, an additional array of prime movers at the at least one inlet surface in fluid communication with the at least one bed to withdraw an enriched gas.

The pressure swing adsorption systems in this example of the present invention may employ one or more beds of adsorbent material having an Aspect ratio of less than 10, less than 5, less than 0.25, or less than 0.125; and an associated mean pressure gradient that exceeds 0.035 psi/inch, exceeds 0.05 psi/inch, exceeds 0.5 psi/inch, or exceeds 1 psi/inch during the separation step. The aspect ratio may be determined using equation (1)

$$\text{Aspect ratio} = L^3/Vbed \qquad (1)$$

wherein L is the bed depth and Vbed is the bed volume.

The at least one bed of adsorbent material used in the pressure swing adsorption systems of this example of the present invention has a Void factor of less than 0.2, less than 0.1 or less than 0.05, wherein the Void factor is according to equation (2)

$$\text{Void factor} = \frac{V_{void}}{V_{void} + V_{bed}} \tag{2}$$

wherein Vvoid is the total dead volume for the pressure swing adsorption system and Vbed is the bed volume.

Arrays of prime movers suitable for use with the pressure swing adsorption systems of the present invention include at least 4 individual prime movers, at least 20 individual prime movers or at least 100 individual prime movers. Individual prime movers suitable for use in the arrays of prime movers in the pressure swing adsorption systems of the present invention should be capable of initiating or stopping the flow of gas therethrough in 2 seconds or less, less than 0.5 seconds, or less than 0.1 seconds and include, but are by no means limited to, piezoelectric pumps, thermopneumatic pumps, electrostatic pumps, ultrasonic pumps, electro-osmosis pumps, electrohydrodynamic pumps, electromagnetic pumps, rotary pumps, shape memory alloy pumps, bimetallic pumps, diaphragm pumps, rotary vane pumps, scroll pumps, solenoid pumps, stepper-motor actuated pumps, piston pumps, linear pumps. In some embodiments of the present invention, the individual prime movers in the prime mover arrays include microelectromechanical (MEM) pumps selected from MEM piezoelectric pumps, MEM thermopneumatic pumps, MEM electrostatic pumps, MEM electromagnetic pumps, MEM ultrasonic pumps, MEM electro-osmosis pumps, MEM diaphragm pumps and MEM electrohydrodynamic pumps. All of the prime movers in a given prime mover array may work in unison. Alternatively, the prime movers in a given prime mover array may operate individually or in groups. For example, the prime movers in a given prime mover array may be tasked to operate in sequence or may be separately tasked to facilitate various aspects of the pressure swing adsorption process. For instance, some of the prime movers in a given prime mover array may be tasked to transfer feed gas into the bed of adsorbent material while other prime movers in the array may be tasked to transfer enriched gas out of the bed of adsorbent material.

Prime mover arrays suitable for use with the present invention may provide a multiplicity of prime movers in a parallel configuration. When so configured, an array of prime movers of the present invention may be designed to deliver or withdraw a gas to or from a bed of adsorbent material, thus providing a flow distribution function and alleviating the need for a separate flow distributor and the dead volume typically associated therewith. Due to the enhanced flow distribution with minimal dead volume, the prime mover arrays of the present invention facilitate adsorption processes, such as processes with small aspect ratios, that were heretofore not practical using conventional systems.

Also, prime mover arrays suitable for use with the present invention provide opportunities for enhanced flow control which may be achieved by starting and stopping certain prime movers in a given array based on the flow requirements at a given stage of the pressure swing adsorption process.

In addition, the prime mover arrays provide systems with enhanced reliability in that one or more prime movers in a given array can fail without causing a significant decrease in the overall system performance.

The pressure swing adsorption systems of this example of the present invention may include more than one array of prime movers. For example, the systems may include an array of feed prime movers in fluid communication with the at least one inlet surface of the bed, wherein the array of feed prime movers operates to feed the feed gas mixture into the bed; and, an array of exhaust prime movers in fluid communication with the at least one inlet surface of the bed, wherein the array of exhaust prime movers operates to withdraw an enriched gas from the bed.

Figure 4:
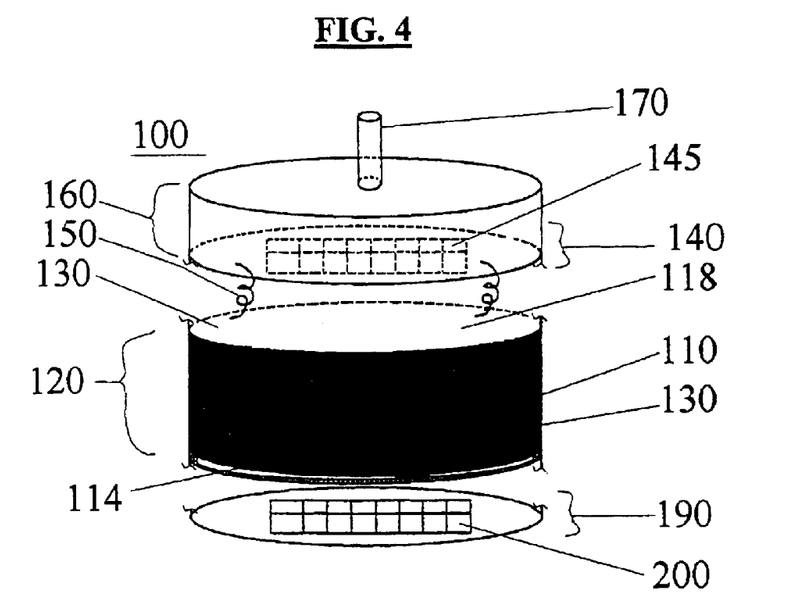
FIG. 4 is a schematic diagram of a pressure swing adsorption apparatus of the present invention; and, FIG. 5 is a schematic diagram of another pressure swing adsorption apparatus of the present invention.

FIG. 4 provides a schematic diagram of a pressure swing adsorption apparatus 100 of the present invention for separating a multi-component feed gas mixture by selectively adsorbing at least one more readily adsorbable component from the feed gas mixture on an adsorbent material. The apparatus illustrated in FIG. 4 includes a bed of adsorbent material 110 contained within an adsorbent housing 120 and retained therein using optional immobilization plates 130 and springs 150. The bed of adsorbent material 110 has an inlet surface 114 and outlet surface 118. Disposed at the outlet surface 118 of the bed of adsorbent material 110 is an outlet valve array 140 of individual outlet valves 145. The outlet valve array 140 is in fluid communication with and interposed between the volume of adsorbent material 110 and a product storage volume 160. The product storage volume 160 is also in fluid communication with a product conduit 170 for transferring a product depleted gas for use in some applications. Disposed at the inlet surface 114 of the bed of adsorbent material 110 is an inlet valve array 190 of individual inlet valves 200. In the embodiment of the invention depicted in FIG. 4, the feed gas mixture is supplied by a pressurized source, for example, a pressurized gas containment cylinder (not shown).

The pressure swing adsorption apparatus of the present invention may exhibit a Void factor according to equation (2) of less than 0.2, less than 0.1 or less than 0.05, $$\text{Void factor} = \frac{V_{void}}{V_{void} + V_{bed}} \tag{2}$$

wherein Vvoid is the total dead volume in the pressure swing adsorption system and Vbed is the bed volume.

Beds of adsorbent material suitable for use in the pressure swing adsorption apparatus of the present invention may have an Aspect ratio according to equation (1) of less than 10, less than 5, less than 0.25, or less than 0.125, $$\text{Aspect ratio} = L^3/V_{bed} \tag{1}$$

wherein L is the bed depth and Vbed is the bed volume.

Beds of adsorbent material suitable for use in the pressure swing adsorption apparatus of the present invention may have a geometry including, but by no means limited to, a cylinder with a circular cross section, a cylinder with a non-circular cross section, a rectangular parallelepiped, and the annular region between two coaxial cylinders.

Adsorbent materials suitable for use in the pressure swing adsorption apparatus of the present invention include, but are by no means limited to, activated carbon; carbon molecular sieve adsorbents; activated alumina; and zeolites including those with type A, type X, mordenite and chabazite structure. Examples of suitable zeolites include CaA, NaX, CaX, NaA, BaX, LiX, NaLSX, CaLSX, SaLSX, AgLSX and LiLSX. One skilled in the art would know how to select a given adsorbent material for use with a given feed gas mixture and desired product materials.

Valves suitable for use in the valve arrays of the pressure swing adsorption apparatus of the present invention should be capable of cycling from an open to a closed position in 1 second or less, less than 1 seconds, less than 0.1 seconds, or less than 0.01 seconds and include, but are by no means limited to, piezoelectric valves, shape memory alloy valves, electrostatic valves, bimetallic valves, thermopneumatic valves and electromagnetic valves. In some embodiments of the present invention, the individual valves in the valve arrays include microelectromechanical (MEM) valves selected from MEM piezoelectric valves, MEM shape memory alloy valves, MEM electrostatic valves, MEM bimetallic valves, MEM thermopneumatic valves and MEM electromagnetic valves. For example, valves and valve arrays suitable for use with the present invention include microelectricalmechanical valve arrays as described by Vandelli et al., *Development of a MEMS Microvalve Array for Fluid Flow Control,* JOURNAL OF MICROELECTROMECHANICAL SYSTEMS, v. 7, No. 4 (December 1998), which reference is incorporated herein by reference as if set forth herein in its entirety. The valves used in the valve arrays of the present invention may include valves with external actuators or internal actuators. The valves may also include check valves which may rely on pressure differences across the valves instead of an independently controllable actuator for their operation.

Figure 5:
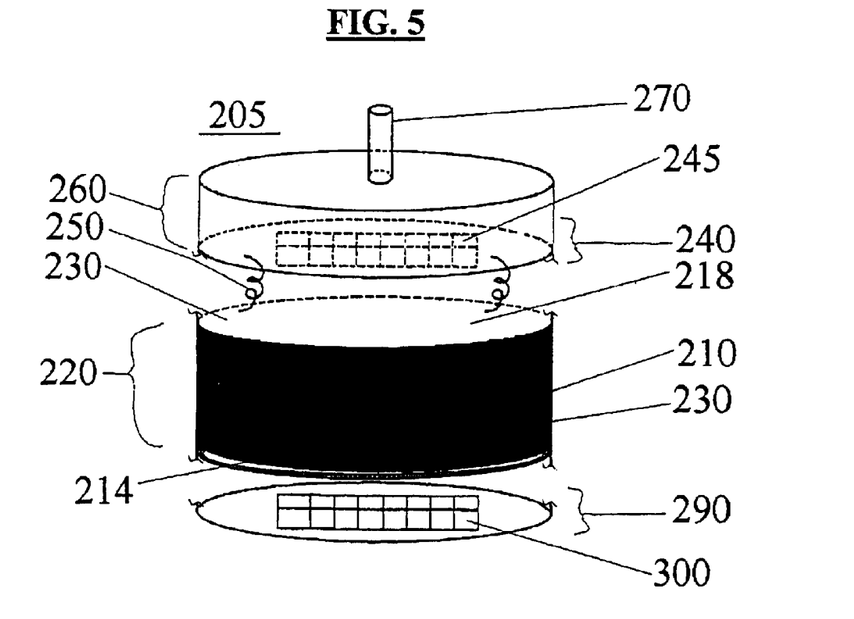

FIG. 5 provides a schematic diagram of another pressure swing adsorption apparatus 205 of the present invention for separating a multi-component feed gas mixture by selectively adsorbing at least one more readily adsorbable component from the feed gas mixture on an adsorbent material. The apparatus illustrated in FIG. 5 includes a bed of adsorbent material 210 contained within an adsorbent housing 220 and retained therein using optional immobilization plates 230 and springs 250. The bed of adsorbent material 210 has an inlet surface 214 and outlet surface 218. Disposed at the outlet surface 218 of the bed of adsorbent material 210 is an outlet valve array 240 of individual outlet valves 245. The outlet valve array 240 is in fluid communication with and interposed between the volume of adsorbent material 210 and a product storage volume 260. The product storage volume 260 is also in fluid communication with a product conduit 270 for transferring a product depleted gas for use in some applications. Disposed at the inlet surface 214 of the bed of adsorbent material 210 is an inlet prime mover array 290 of individual inlet prime movers 300. In the embodiment of the invention depicted in FIG. 5, the feed gas mixture may be extracted from, for example, the atmosphere surrounding the apparatus 205 or a gas storage container (not shown).

Prime movers suitable for use in the prime mover arrays of the pressure swing adsorption apparatus of the present invention should be capable of initiating or stopping the flow of gas therethrough in 2 seconds or less, less than 0.5 seconds, or less than 0.1 seconds and include, but are by no means limited to, piezoelectric pumps, thermopneumatic pumps, electrostatic pumps, ultrasonic pumps, electroosmosis pumps, electrohydrodynamic pumps, electromagnetic pumps, rotary pumps, shape memory alloy pumps, bimetallic pumps, diaphragm pumps, rotary vane pumps, scroll pumps, solenoid pumps, stepper-motor actuated pumps, piston pumps, and linear pumps. In some embodiments of the present invention, the individual prime movers in the prime mover arrays include microelectromechanical (MEM) pumps selected from MEM piezoelectric pumps, MEM thermopneumatic pumps, MEM electrostatic pumps, MEM electromagnetic pumps, MEM ultrasonic pumps, MEM electro-osmosis pumps, MEM diaphragm pumps and MEM electrohydrodynamic pumps. For example, prime movers suitable for use with the present invention include microelectromechanical pumps as described by Maluf, INTRODUCTION TO MICROELECTROMECHANICAL SYSTEMS ENGINEERING, 1$^{st}$ ed., which is incorporated herein by reference as if set forth herein in its entirety.

The pressure swing adsorption apparatus of the present invention may be constructed in modular fashion. For example, the prime mover arrays, valve arrays, adsorbent beds, product storage, etc., may be constructed as individual microelectromechanical modules. The construction of the individual components for these modules for the prime movers and valves is described for example in Maluf, INTRODUCTION TO MICROELECTROMECHANICAL SYSTEMS ENGINEERING, pp. 147–156 and 190–192, already incorporated herein by reference in its entirety. These individual components may be linked together to form prime mover array or valve array modules, for example, using the methods described in Vandelli, et al., *Development of a MEMS Microvalve Array for Fluid Row Control,* JOURNAL OF MICROELECTROMECHANICAL SYSTEMS, v. 7, No. 4 (December 1998); Bousse, et al., *High-density arrays of valves and interconnects for fluid switching,* PROC. IEEE SOLID-STATE SENSOR AND ACTUATOR WORKSHOP, HILTON HEAD ISLAND, S.C., Jun. 3–6, 1996, pp. 272–275. These individual modules can then be linked together in a myriad of configurations and permutations of the devices illustrated in FIGS. 4 and 5. That is, the individual modules may be linked to form devices having multiple parallel or series linked adsorbent beds. These individual modules may be linked together, for example, using the methods described in Mourlas, et al., *Novel Interconnection and Channel Technologies for Microfluidics,* Micro Total Analysis '98 Proceedings of the mTAS '98 Workshop held in Banff, Canada, 13–16 October 1998, D. J. Harrison and A. van de Berg editors, Kluwer Academic Publishers; each of which is incorporated herein by reference as d set forth herein in their entireties.

The teachings of the present invention have applicability for large scale (production rates in excess of 1000 standard liters per minute), medium bench scale (production rates between 1000 to 10 standard liters per minute), small scale (production rates less than 10 standard liters per minute) and everything in between. In some embodiments, the pressure swing adsorption apparatus of the present invention may be constructed on a scale sufficiently small to enable the device to be carried by an individual. Such devices would be useful for providing, for example, oxygen to an individual for medical purposes.

The present invention having been disclosed in connection with the foregoing embodiments, such additional embodiments will now be apparent to persons skilled in the art The present invention is not intended to be limited to the embodiments specifically mentioned, and accordingly reference should be made to the appended claims rather than the foregoing discussion, to assess the spirit and scope of the present invention in which exclusive rights are claimed.

All patents, patent applications and publications mentioned in this specification are herein incorporated by reference to the same extent as if each individual reference was specifically and individually indicated to be incorporated by reference.

What is claimed is:

1. A pressure swing adsorption process for the separation of a multi-component feed gas mixture by selectively adsorbing at least one more readily adsorbable component in a bed of adsorbent material, comprising:
   (a) pressurizing the bed;
   (b) passing the feed gas mixture through the bed of adsorbent material from an inlet surface of the bed to an outlet surface of the bed, wherein the at least one more readily adsorbable component is preferentially adsorbed by the adsorbent material, and withdrawing a depleted gas depleted in the at least one more readily adsorbable component exiting from the outlet surface of the bed;

(c) depressurizing the bed by withdrawing an enriched gas enriched in the at least one more readily adsorbable component from the bed;

(d) repeating (a)–(c) in a cyclic manner;

wherein the bed has a bed depth, L, and a bed volume, Vbed; wherein the bed has an aspect ratio according to equation (1)

$$\text{Aspect ratio} = L^3/Vbed \qquad (1)$$

wherein the aspect ratio for the bed is less than 10; and, wherein the mean pressure gradient in the bed in (b) exceeds 0.035 psi/inch.

2. The pressure swing adsorption process of claim 1, wherein the feed gas mixture is air and the depleted gas comprises oxygen at a concentration of 70 mol % or higher.

3. The pressure swing adsorption process of claim 1, wherein the depleted gas comprises hydrogen at a concentration of 80 mol % or higher.

4. The pressure swing adsorption process of claim 2, wherein the production rate of the depleted gas is between 0.5 and 10 standard liters per minute.

5. The pressure swing adsorption process of claim 1, wherein each repeat of (a) through (c) defines a cycle with a cycle time of 15 seconds or less.

6. The pressure swing adsorption process of claim 1, wherein the adsorbent bed consists of adsorbent particles with an average equivalent diameter of less than 1.0 mm.

7. The pressure swing adsorption process of claim 1, wherein the adsorbent bed consists of a structured adsorbent.

8. The pressure swing adsorption process of claim 1, wherein the bed has a Void factor according to equation (2) of less than 0.2

$$\text{Void factor} = \frac{Vvoid}{Vvoid + Vbed} \qquad (2)$$

wherein Vvoid is the total dead volume in the pressure swing adsorption system and Vbed is the bed volume.

9. A pressure swing absorption process for the separation of a multi-component feed gas mixture by selectively adsorbing at least one more readily adsorbable component in a bed of adsorbent material having an inlet surface and an outlet surface, comprising:

(a) pressurizing the bed;

(b) passing the feed gas mixture through the bed of adsorbent material, wherein the at least one more readily adsorbable component is preferentially adsorbed by be adsorbent material, and withdrawing a depleted gas depleted in the at least one more readily adsorbed component exiting from the bed;

(c) halting the withdrawal of the depleted gas from the bed and halting the feed of the feed gas to the bed;

(d) depressurizing the bed by withdrawing an enriched gas enriched in the at least one more readily adsorbable component from the bed;

(e) feeding a portion of the depleted gas into the bed to facilitate the extraction of the at least one more readily adsorbable component from the adsorbent material; and, (f) repeating operations (a)–(e) in a cyclic manner;

wherein the at least one more readily adsorbable component is preferentially adsorbed by the adsorbent material at the feed pressure, wherein the bed has a bed depth, L, and a bed volume, Vbed; wherein the bed has an aspect ratio according to equation (1)

$$\text{Aspect ratio} = L^3/Vbed \qquad (1)$$

wherein the aspect ratio for the bed is less than 10; and, wherein the mean pressure gradient in the bed in (b) exceeds 0.035 psi/inch.

10. The pressure swing adsorption process of claim 9, wherein each repeat of (a) through (e) defines a cycle with a cycle time of 15 seconds or less.

11. A pressure swing adsorption system for the separation of a multi-component feed gas mixture by selectively adsorbing at least one more readily adsorbable component on an adsorbent material, comprising:

(a) a bed of the adsorbent material, wherein the adsorbent material more strongly adsorbe the at least one more readily adsorbable component and wherein the bed has at least one inlet surface and at least one outlet surface;

(b) at least one prime mover supplying the multi-component feed gas mixture to the pressure swing adsorption system; and, (c) an array of valves in fluid communication with the at least one inlet surface;

wherein the valves cycle in unison from an open to a closed position in 1 second or less.

12. The pressure swing adsorption system of claim 11, wherein the bed has a bed depth, L, and a bed volume, Vbed; wherein the bed has an aspect ratio according to equation (1)

$$\text{Aspect ratio} = L^3/Vbed \qquad (1)$$

wherein the aspect ratio for the bed is less than 10.

13. The pressure swing adsorption system of claim 11, wherein the bed has a Void factor according to equation (2) of less than 0.2

$$\text{Void factor} = \frac{Vvoid}{Vvoid + Vbed} \qquad (2)$$

wherein Vvoid is the total dead volume in the pressure swing adsorption system and Vbed is the bed volume.

14. The pressure swing adsorption system of claim 11, wherein the array of valves comprises at least 4 individual valves.

15. The pressure swing adsorption system of claim 11, wherein the valves in the array of valves are selected from the group consisting of piezoelectric valves, shape memory alloy valves, electrostatic valves, bimetallic valves, thermopneumatic valves and electromagnetic valves.

16. A pressure swing adsorption system for the separation of a multi-component feed gas mixture by selectively adsorbing at least one more readily adsorbable component on an adsorbent material, comprising:

(a) a bed of the adsorbent material, wherein the adsorbent material more strongly adsorbs the at least one more readily adsorbable component and wherein the bed has at least one inlet surface and at least one outlet surface; and (b) at least one array of prime movers in fluid communication with the at least one inlet surface;

wherein flow through the prime movers can be started or stopped in less than 2 seconds.

17. The pressure swing adsorption system of claim 16, wherein the bed has a bed depth, L, and a bed volume, Vbed; wherein the bed has an aspect ratio according to equation (1)

$$\text{Aspect ratio} = L^3/Vbed \quad (1)$$

wherein the aspect ratio for the bed is less than 10.

18. The pressure swing adsorption system of claim 16, wherein the bed has a Void factor according to equation (2) of less than 0.2

$$\text{Void factor} = \frac{Vvoid}{Vvoid + Vbed} \quad (2)$$

wherein Vvoid is the total dead volume in the pressure swing adsorption system and Vbed is the bed volume.

19. The pressure swing adsorption system of claim 16, further comprising:
   (c) at least one array of prime movers at the at least one outlet surface in fluid communication with the bed.

20. The pressure swing adsorption system of claim 16, wherein the at least one array of prime movers comprises:
   an array of feed prime movers in fluid communication with the at least one inlet surface of the bed, wherein the feed prime movers operate to feed the feed gas mixture into the bed; and,
   an array of exhaust prime movers in fluid communication with the at least one inlet surface of the bed, wherein the exhaust prime moves operate to withdraw an enriched gas from the bed.

21. The pressure swing adsorption system of claim 16, wherein the at least one array of prime movers operates to feed the feed gas mixture into the bed during a feed gas feeding step and operates to withdraw an enriched gas from the bed during a regeneration step.

22. The pressure swing adsorption system of claim 16, wherein each array of prime movers comprises at least 4 individual prime movers.

23. The pressure swing adsorption system of claim 16, wherein the prime movers in the at least one array of prime movers are selected from the group consisting of piezoelectric pumps, thermopneumatic pumps, electrostatic pumps, electromagnetic pumps, ultrasonically drive pumps, electroosmosis pumps, diaphragm pumps and electrohydrodynamic pumps.

24. An apparatus for the pressure swing adsorption separation of a multi-component feed gas mixture by selectively adsorbing at least one more readily adsorbable component on an adsorbent material, comprising:
   (a) a bed of adsorbent material with at least one inlet surface and at least one outlet surface; wherein the adsorbent material more strongly adsorbs the at least one more readily adsorbable component; and
   (b) an array of valves in fluid communication with the at least one inlet surface;
   wherein the vales cycle in unison from an open to closed position.

25. The apparatus of claim 24, wherein the bed has a bed depth, L, and a bed volume, Vbed; wherein the bed has an aspect ratio according to equation (1)

$$\text{Aspect ratio} = L^3/Vbed \quad (1)$$

wherein the aspect ratio for the bed is less than 10.

26. The apparatus of claim 24, wherein the bed has a Void factor according to equation (2) of less than 0.2

$$\text{Void factor} = \frac{Vvoid}{Vvoid + Vbed} \quad (2)$$

wherein Vvoid is the total dead volume in the pressure swing adsorption system and Vbed is the bed volume.

27. The apparatus of claim 24, wherein the bed has a geometry selected from the group consisting of a cylinder with a circular cross section, a cylinder with a non-circular cross section, a rectangular parallelepiped, and an annular region between two coaxial cylinders.

28. The apparatus of claim 24, wherein the apparatus is designed and sized to be carried by an individual.

29. The apparatus of claim 24, wherein the apparatus is designed to provide oxygen for medical purposes.

30. An apparatus for the pressure swing adsorption separation of a multi-component feed gas mixture by selectively adsorbing at least one more readily adsorbable component on an adsorbent material, comprising:
   (a) a bed of adsorbent material with at least one inlet surface and at least one outlet surface; wherein the adsorbent material more strongly adsorbs the at least one more readily adsorbable component; and
   (b) at least one array of prime movers in fluid communication with the at least one inlet surface;
   wherein flow through the array of prime movers can be started or stopped in 2 seconds or less.

31. The apparatus of claim 30, wherein the bed has a bed depth, L, and a bed volume, Vbed; wherein the bed has an aspect ratio according to equation (1)

$$\text{Aspect ratio} = L^3/Vbed \quad (1)$$

wherein the aspect ratio for the bed is less than 10.

32. The apparatus of claim 30, wherein the bed has a Void factor according to equation (2) of less than 0.2

$$\text{Void factor} = \frac{Vvoid}{Vvoid + Vbed} \quad (2)$$

wherein Vvoid is the total dead volume in the pressure swing adsorption system and Vbed is the bed volume.

33. The apparatus of claim 30, wherein the apparatus is designed and sized to be carried by an individual.

34. The apparatus of claim 30, wherein the apparatus is designed to provide oxygen for medical purposes.

35. The apparatus of claim 30, wherein the apparatus is designed to provide hydrogen to a fuel cell.

36. A pressure swing adsorption system comprising a bed of adsorbent material wherein the adsorbent material more strongly adsorbs at least one more readily adsorbable component; and an array of microelectromechanical (MEM) prime movers in fluid communication with said bed.

37. A pressure swing adsorption system comprising a bed of adsorbent material wherein the adsorbent material more strongly adsorbs at least one more readily adsorbable component; and an array of microelectromechanical (MEM) valves in fluid communication with said bed.

* * * * *

UNITED STATES PATENT AND TRADEMARK OFFICE
CERTIFICATE OF CORRECTION

PATENT NO. : 6,802,889 B2
DATED : October 12, 2004
INVENTOR(S) : David Ross Graham, James Michael Occhialini and Pushpinder Singh Puri It is certified that error appears in the above-identified patent and that said Letters Patent is hereby corrected as shown below:

Column 19,
Line 54, delete "be" and substitute therefore -- the --.

Column 20,
Line 20, delete "absorbe" and substitute therefore -- absorbs --

Column 21,
Line 56, delete "vales" and substitute therefore -- valves --
Line 56, insert the word -- a -- between the words "to" and "closed"

Signed and Sealed this

Twenty-first Day of December, 2004

JON W. DUDAS
*Director of the United States Patent and Trademark Office*